June 11, 1968 J. J. SEARLES ETAL 3,387,508
MULTIPLE SPEED RATIO POWER TRANSMISSION CONTROL MECHANISM
WITH PNEUMATICALLY OPERATED RATIO CONTROLLERS
Filed Aug. 1, 1966 5 Sheets-Sheet 5

INVENTORS:
WILLIAM G. WINN
BY JOHN J. SEARLES
ATTORNEYS.

United States Patent Office 3,387,508
Patented June 11, 1968

3,387,508
MULTIPLE SPEED RATIO POWER TRANS-
MISSION CONTROL MECHANISM WITH
PNEUMATICALLY OPERATED RATIO
CONTROLLERS
John J. Searles, Northville, and William C. Winn, Inkster,
Mich., assignors to Ford Motor Company, Dearborn,
Mich., a corporation of Delaware
Filed Aug. 1, 1966, Ser. No. 569,217
12 Claims. (Cl. 74—864)

Our invention relates generally to multiple speed-ratio, automatic power transmission systems for use in automotive vehicle drivelines with an internal combustion engine. It relates more particularly to improvements in control valve circuits for such a system, and to valve components capable of establishing a control pressure signal that is proportional in magnitude to the manifold pressure of the internal combustion engine of the driveline with which it is used. The signal may be used to initiate automatic torque ratio changes so that the driveline can operate at the ratio that will result in optimum performance for any given driving condition.

It is usual practice in arrangements of this type to provide a throttle valve assembly that communicates directly with the air-fuel mixture intake manifold of the internal combustion engine. The negative pressure of the manifold acts upon the servo for the throttle valve system to produce a modulating force. The resulting output pressure signal is distributed to shift valves that control distribution of control pressure to each of the clutch and brake servos. The valves respond to changes in the output pressure of the throttle valve system as well as to changes in vehicle speed. Thus a downshift from a higher ratio to a relatively low ratio can be achieved for a given range of vehicle speeds simply by advancing the engine carburetor throttle. This produces an increase in the magnitude of the manifold pressure which in turn results in a change in the pressure signal distributed to the shift valves to produce the required ratio change. If the vehicle is traveling at a speed less than a first predetermined value, it is possible to obtain a so-called torque demand downshift. The automatic ratio shifting tendencies of the valve system can be overruled, however, by means of a forced downshift valve. This permits distribution of full control pressure to the distributor valves thereby overruling the action of the throttle valve pressure to produce a downshift when the vehicle is traveling at a speed less than a second relatively high, predetermined value.

In prior mechanisms the downshift valve is actuated by the vehicle operator as he advances the engine carburetor throttle through a so-called detent position, which corresponds to the wide-open throttle setting of the engine. Motion is transmitted from the engine carburetor throttle to the downshift valve by means of a mechanical linkage.

It is an object of our invention to provide a valve system that will produce a downshift function of the downshift valve without the necessity for using a mechanical linkage. In doing this we have eliminated troublesome linkage adjustment problems normally associated with conventional control valve systems. We have also eliminated problems of interference between the linkage and the various components of the chassis of the vehicle due to space limitations. We expect that our improved arrangement also will eliminate transfer of engine vibrations from the engine carburetor linkage to the vehicle accelerator pedal which normally are associated with a valve system having a mechanical, forced-downshift, valve arrangement.

A principal feature of our invention comprises a means for distributing to a manifold pressure-operated throttle valve system a pressure signal that overrules the normal influences of the manifold pressure of the engine. We are aware of certain prior art mechanisms that employ a pneumatic kickdown feature of this type, but these usually include an auxiliary valve under the control of the the vehicle operator for admitting atmospheric air into the throttle valve system thereby establishing a maximum throttle pressure output signal. This signal then is used to force a downshift of the automatic fluid pressure distributor valves. The auxiliary valve in turn is triggered upon movement of the engine carburetor throttle valve to its maximum setting. At any throttle valve setting less than the maximum value, the throttle valve system in the transmission operates in the usual fashion in response to changes in engine manifold pressure.

One disadvantage of such prior art pneumatic kickdown arrangements is its tendency to cause the throttle valve signal to rise to its maximum value whenever the carburetor throttle is opened to a relatively wide setting. Thus the signal that is used to obtain a forced downshift is indistinguishable from the signal that is developed by the throttle valve system during a torque demand downshift. Thus the driver operator loses one control variable that otherwise would be available to him in controlling the vehicle driveline.

During operation of the engine at relatively moderate speeds, it is possible in such a known arrangement for the manifold vacuum to reach a value that approximates atmospheric pressure when the carburetor throttle is moved to an advanced setting. Thus the throttle valve system is incapable of distinguishing between a demand by the vehicle operator for a forced downshift and a demand by the vehicle operator for a so-called torque demand downshift.

It is an object of our invention to overcome the shortcomings in prior art pneumatic kickdown valve systems by providing a means for overruling the tendency of the throttle valve system to develop a kickdown pressure at any carburetor setting in the range of valve settings that is less than the so-call "through-detent" throttle valve position regardless of whether the manifold pressure of the system rises to a value that would approximate atmospheric pressure.

It is a further object of our invention to provide a pneumatic kickdown valve system of the type above set forth wherein provision is made for isolating the pressure signal made available to the throttle valve system whenever the manifold pressure rises to a value less than a predetermined maximum thereby establishing a limiting value for the throttle valve output pressure that is produced for any engine carburetor throttle setting less than the so-called "through-detent" setting.

Other objects and features of our invention will become apparent from the following description and from the accompanying drawings wherein:

FIGURE 3 shows in schematic form a primary diaphragm assembly in combination with a second diaphragm assembly as part of the pneumatic, forced kickdown, valve arrangement;

FIGURE 4a is a cross-sectional view of an equalizer valve taken along the plane of section line 4A—4A of FIGURE 3; FIGURE 4b is a view similar to FIGURE 4a showing the equalizer valve in an open position;

FIGURE 5 is a cross-sectional view taken along the plane of section line 5—5 of FIGURE 4b, and, FIGURE 6 is a sectional view showing the secondary vacuum diaphragm assembly.

Figure 1:
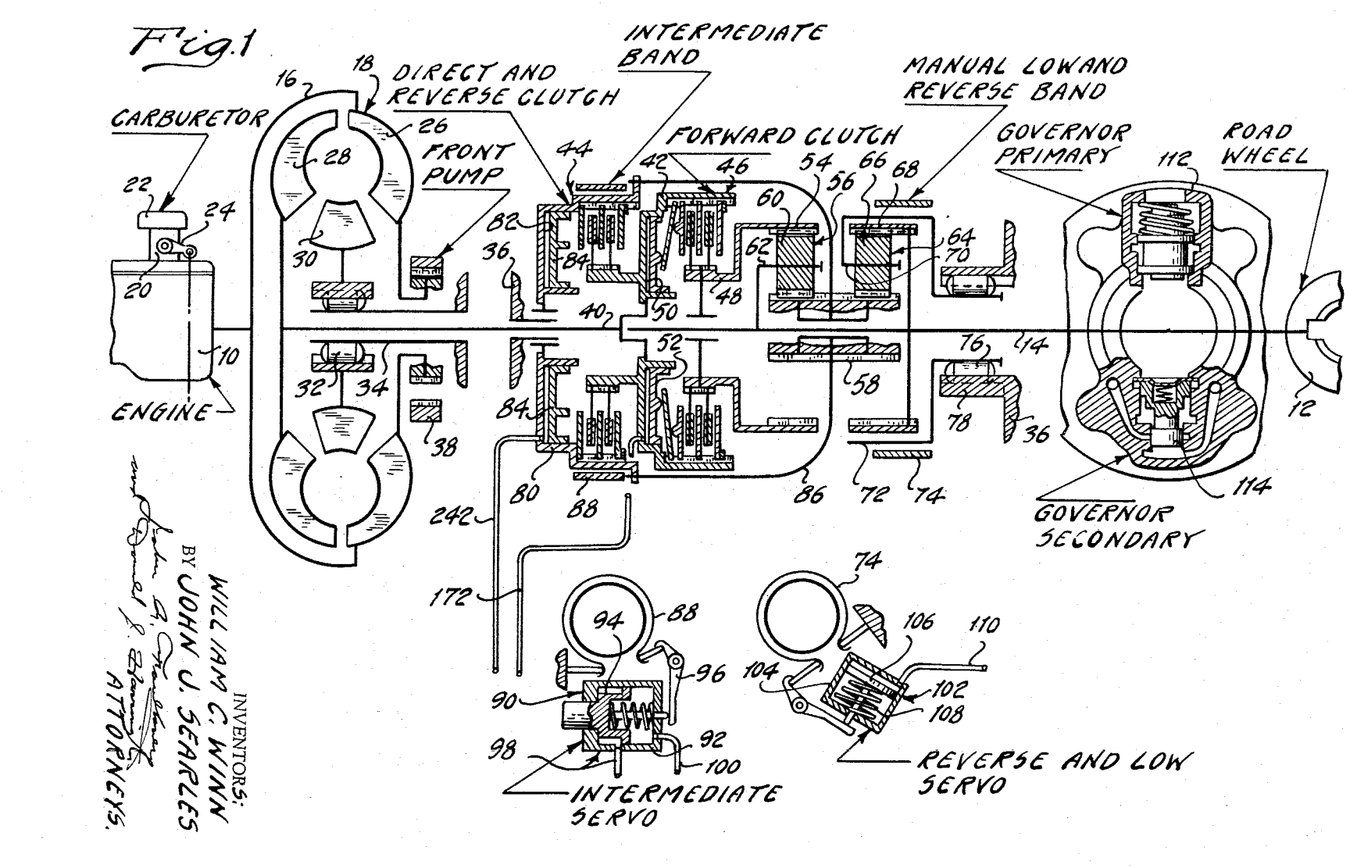
FIGURE 1 shows in schematic form a power transmission mechanism capable of being controlled by my improved valve system.

In FIGURE 1, numeral 10 designates an internal combustion vehicle engine. Road wheels are shown at 12. These are connected by means of a driveshaft and a differential and axle assembly to a power output shaft 14 of the transmission mechanism.

Engine 10 includes a crankshaft that is drivably connected to an impeller shell 16 of a hydrokinetic torque converter mechanism 18. Engine 10 includes air-fuel mixture intake manifold 20 which is supplied with an air-fuel mixture by a carburetor 22. The throat on the carburetor 22 receives a driver-controlled throttle valve operated by means of a throttle valve linkage 24.

The converter 18 includes an impeller 26, a bladed turbine 28 and a bladed stator 30. The impeller, the turbine and the stator are situated in toroidal fluid-flow relationship in the usual fashion in a common torus circuit. Stator 30 is adapted to freewheel in the direction of motion of the impeller, but motion of the stator 30 in the opposite direction is inhibited by an overrunning brake 32 which is anchored against a relatively stationary stator sleeve shaft 34. This forms a part of the transmission housing shown in part at 36. The impeller 26 is drivably connected to a positive displacement fluid pump 38 which is identified also by the label "front pump" in FIGURE 1. This serves as a fluid pressure source for the control system to be described subsequently.

The turbine 28 is connected to a turbine shaft 40 which is connected in turn to clutch member 42. This member 42 forms a part of a direct and reverse clutch 44 and a forward clutch 46. Clutch 46 includes a clutch element 48 carrying friction clutch discs which cooperate with friction clutch discs carried by the member 42 to form a multiple disc clutch assembly. The discs can be engaged and disengaged by means of a fluid pressure operated servo comprising an annular cylinder 50 formed in the member 42 and an annular piston 52 situated within the cylinder 50. Member 48 is connected to a ring gear 54 by a first planetary gear unit 56.

Gear unit 56 includes a sun gear 58, a set of planet pinions 60, and carrier 62 which journals the pinions 60, the latter being in meshing engagement with ring gear 54 and sun gear 58. Sun gear 58 is common to a second planetary gear unit 64. This gear unit includes a set of planet pinions 66 which mesh with sun gear 58 and a ring gear 68. Pinions 66 are journalled on a carrier 70.

Carrier 70 forms a brake drum 72 about which is positioned a manual low-and-reverse brake band 74. Drum 72 may be anchored against rotation in one direction by an overrunning brake 76 having an outer race 78 which is cammed to receive overrunning brake rollers. Race 78 is connected to the housing 36.

The direct-and-reverse clutch 44 includes a drum 80 which carries friction clutch discs which cooperate with discs carried by the member 42 to define the multiple disc clutch assembly 44. The discs of the clutch assembly 44 can be engaged and released by means of a fluid pressure operated servo comprising an annular cylinder 82 and an annular piston 84 located in the cylinder 82.

Member 80 is connected drivably to sun gear 58 by means of a drive shell 86. This drive shell can be anchored together with the sun gear 58 by means of a friction brake band 88 which surrounds the drum 80.

Brake band 88 can be applied and released by means of an intermedite servo 90. This includes a cylinder 92 and a cooperating piston 94. The cylinder 92 and piston 94 together define a pair of opposed fluid pressure chambers. A spring may be used if desired to urge the piston 94 in a left-hand direction, as viewed in FIGURE 1. The motion of the piston can be transmitted to the working end of the brake band 88 by suitable mechanical connection 96. When both pressure chambers are pressurized, the piston assumes the position shown. If the left-hand side of the piston 94 is pressurized while its right-hand side is exhausted, the servo will assume a brake applying position. Fluid pressure is distributed to the apply side of the servo through a feed passage 98 and fluid pressure is distributed to the release side of the servo through a feed passage 100.

Brake band 74 can be applied and released by means of a fluid pressure operated servo 102. This includes a cylinder 104 within which is positioned a piston 106. A spring 108 can be used to release normally the piston and urge it in a brake releasing direction. Fluid pressure is distributed through a feed passage 110.

Connected to the driven shaft 14 is a governor valve assembly comprising a primary governor valve 112 and a secondary governor valve 114. These are situated within a common valve body. Valve 112 inhibits the operation of governor valve 114 at speeds that are less than a predetermined value. At speeds greater than that value, however, valve 114 produces a speed signal that may be utilized by the valve system as an indication of vehicle speed. The primary governor 112 is inoperative during operation of the mechanism at speeds greater than the predetermined value.

The mechanism illustrated in FIGURE 1 is caapble of producing three forward driving speed ratios and a single reverse speed ratio. To achieve operation in the lowest forward speed ratio, it is necessary to engage the forward drive clutch. The turbine torque developed by the hydrokinetic torque converter 18 is distributed to shaft 40 and hence to ring gear 54 through the engaged clutch 46. Carrier 62 of the gear unit 56 and ring gear 68 of the gear unit 64 both are connected to the power output shaft 14. Thus carrier 62 tends to resist rotation. This causes sun gear 58 to be driven in a reverse direction relative to the direction of motion of the ring gear 54. This then tends to drive ring gear 68 and power output shaft 14 in a forward driving direction. Carrier 70 acts as a reaction member for the system since it is anchored by overrunning brake 76. Thus there is a split torque delivery path produced during low speed-ratio operation. A part of the torque distributed from the turbine shaft 40 is transferred through the carrier 62 to the power output shaft 14, and the balance of the torque is distributed from ring gear 68 to the power output shaft 14.

If continuous operation in the low speed-ratio is desired, the brake band 74 can be applied. This inhibits rotation of the carrier 70 in either direction. Thus the gearing is capable of accommodating coasting torque delivery from the shaft 14 to the shaft 40. As will be seen subsequently with reference to the description of FIGURES 2a, 2b and 2c, the mechanism is incapable of upshifting to a higher speed ratio when the manual low and reverse brake band 74 is applied.

To effect a speed ratio change from the low speed-ratio to an intermediate speed-ratio, it merely is necessary to engage brake band 88. This anchors drive shell 86 and the sun gear 58. Thus the sun gear is capable of acting as a reaction member for the planetary gear unit 56. Torque continues to be applied to the ring gear 58 through the clutch 46. Carrier 62, however, is driven at an increased speed relative to the speed of shaft 40. Thus the overrunning brake shown in part at 76 freewheels and the full power is delivered through the gear unit 56. Gear unit 64 is inoperative under these conditions.

A speed-ratio change to the high speed ratio can be achieved by engaging simultaneously both clutches 46 and 44 while both brakes are released. This locks together the elements of the gearing for rotation in unison, thereby establishing a 1:1 speed ratio for the shafts 40 and 14.

Reverse drive is obtained by releasing the forward clutch 46 and applying brake band 74. Turbine torque then is delivered from shaft 40 and through clutch 44 to the sun gear 58. Carrier 70 acts as a reaction member as the sun gear 58 drives in a reverse direction the ring gear 68 and the power output shaft 14. Gear unit 56 is inoperative under these conditions.

The three forward driving speed ratios and the single reverse speed ratio are established and disestablished by the fluid pressure operated clutch-and-brake servos which in turn are under the control of the automatic control valve system of FIGURES 2a through 6.

Figure 2A:
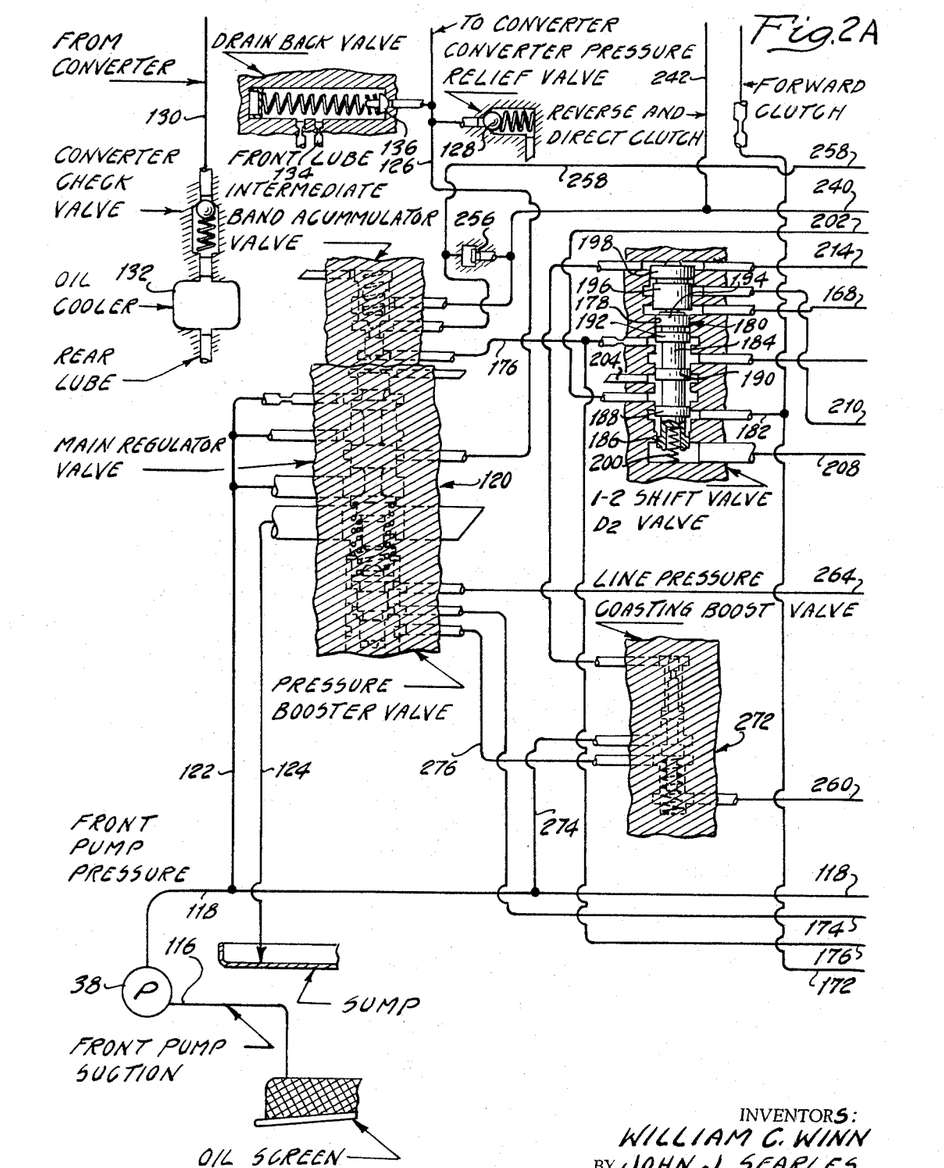
FIGURES 2a, 2b and 2c show in schematic form a valve circuit for controlling the clutch and brake servos of the embodiment of FIGURE 1.

In FIGURE 2a the engine-driven front pump 38 receives fluid from an oil sump formed by the lower region of the transmission housing. It communicates with the sump through a fluid supply passage 116. The high pressure discharge passage for the pump 38, which is shown at 118, communicates with a main pressure regulator valve 120 through a passage 122. Regulator valve 120 serves to establish a bypass flow from the engine driven pump to the sump through a flow return passage 124. Regulator valve 120 functions also to supply a regulated pressure to passage 126, which extends to the torus circuit of the hydrokinetic torque converter. The maximum pressure in the converter is maintained at a desired value less than the value at which a converter pressure relief valve 128 is calibrated. If for some reason the pressure exceeds a safe value, valve 128 will open the converter circuit to exhaust the fluid supplied through converter supply passage 126. Fluid is returned from the converter through a passage 130. It then passes through a check valve and cooler 132 to the various lubrication points in the transmission system.

The converter feed passage 126 communicates with other lubrication ports 134 through a drainback valve 136. This valve causes the torus circuit of the converter to remain filled after the engine is at rest and the valve system is depressurized.

Figure 2B:
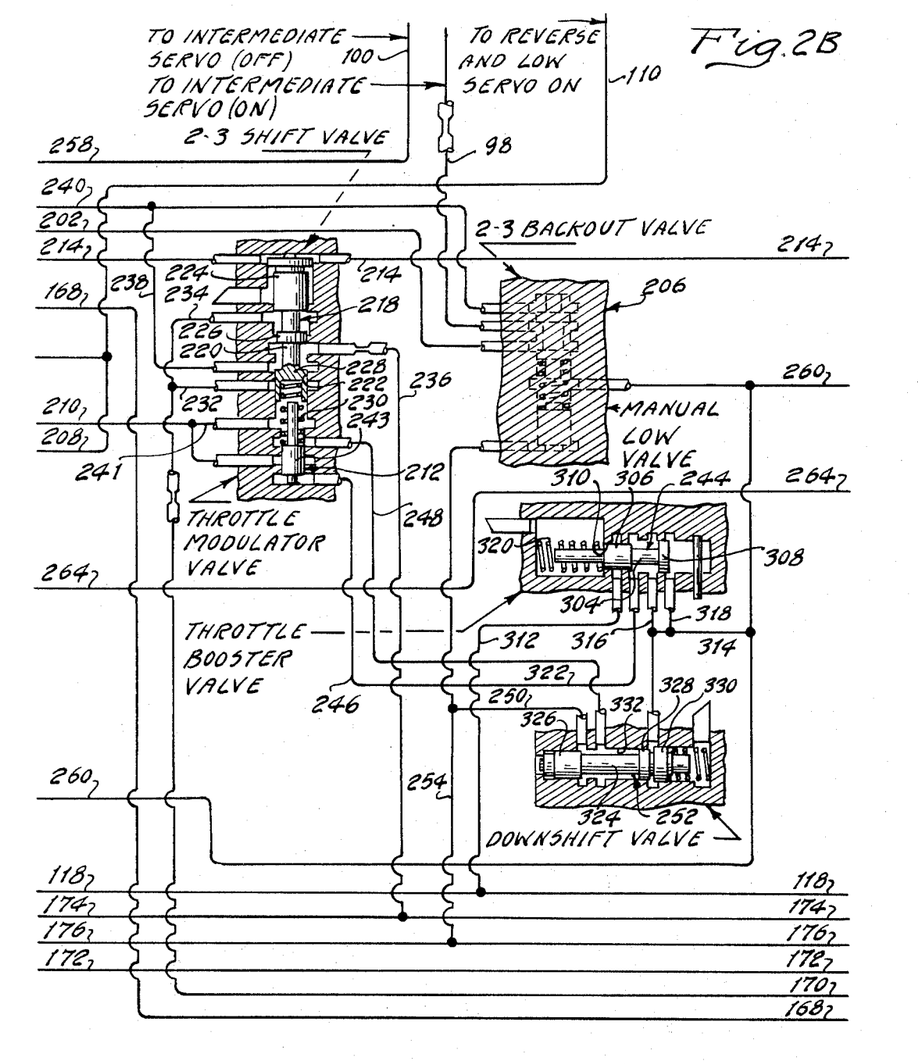
Figure 2C:
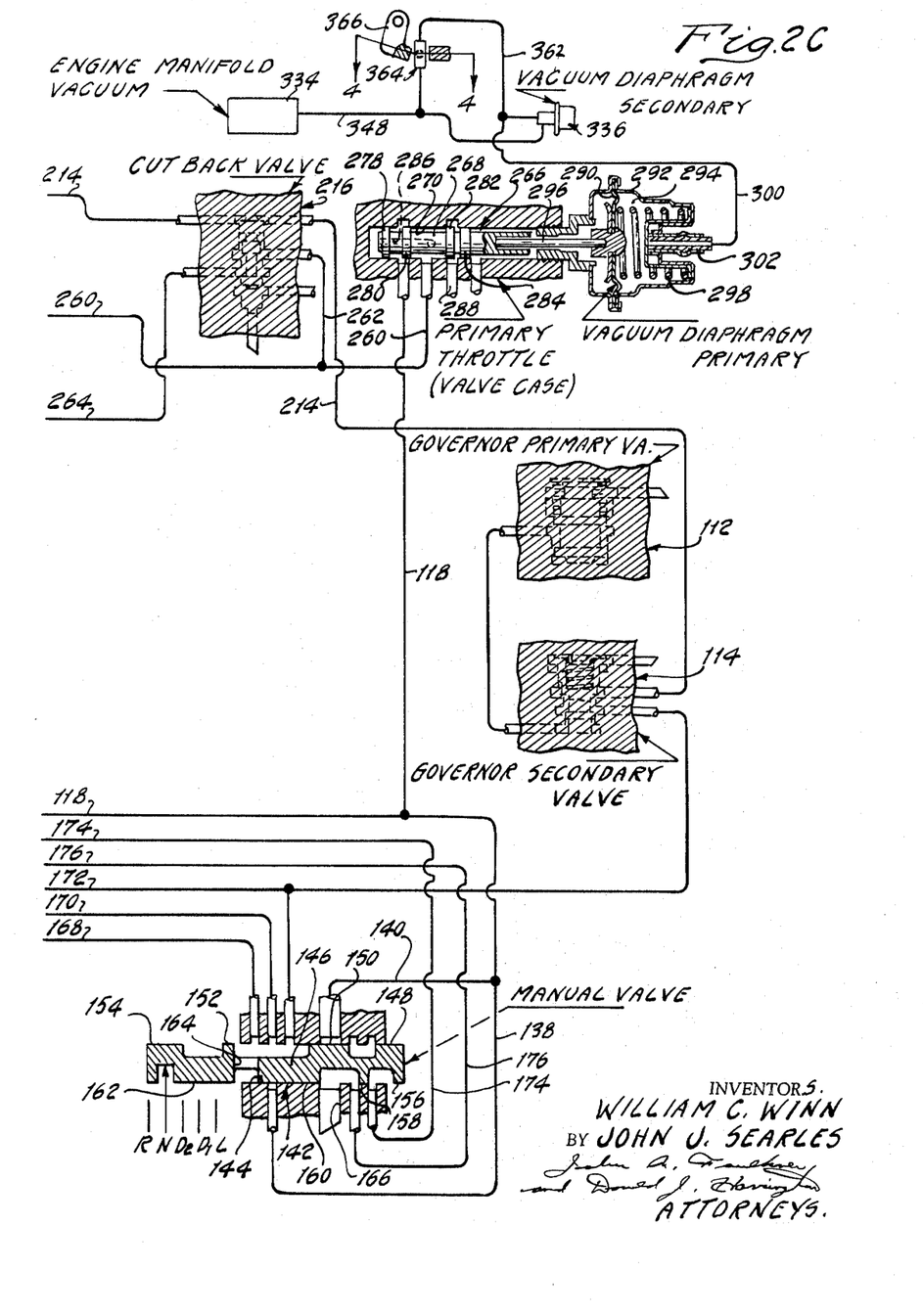

Pressure from the output side of the pump 38 is distributed through passage 118 to manual valve supply passage 138 and to branch passage 140. These communicate with a manual valve, shown in FIGURE 2c, which comprises a cylindrical valve chamber 144 having internal valve lands. Slidably disposed within the valve chamber is a valve element 146 which can be adjusted in the direction of the axis of the chamber 144 by the vehicle operator from one position to another. The various operating positions are indicated by the symbols R, D2, D1 and L in FIGURE 2b. These positions correspond, respectively, to the reverse drive positon, the neutral position, the second drive range position, the first drive range position and the manual low drive position. In FIGURE 2c valve element 146 is shifted to the neutral position.

Valve element 146 includes two series of external valve lands situated 180° apart in juxtaposition with respect to each other. The first series is shown at 148, 150, 152 and 154. The second series is shown at 156, 158, 160 and 162. The adjacent lands of each series define flow-directing passages. The space between lands 160 and 162 is in fluid communication with the space between lands 150 and 152, a cross flow port 164 being provided for this purpose.

When the manual valve element 146 assumes the neutral position shown in FIGURE 2c, land 150 blocks passage 140 and 160 blocks passage 138. Thus fluid pressure distribution to the other element of the valve circuit is interrupted.

Valve chamber 144 is provided with an exhaust port 166 and with an exhaust port at either end of the valve chamber through which the manual valve 146 extends. If the manual valve element 146 assumes the D2 position, pressure is distributed from passages 140 and 138 to each of the passages 168, 170 and 172, which communicate with the valve chamber 144 at adjacent locations. As indicated, passages 174 and 176, which also communicate with the valve chamber 144, are exhausted through exhaust port 166 when the valve element 146 assumes the D2 position.

If the manual valve element 146 is shifted to the reverse position R, passages 168, 170 and 172 become exhausted through the left-hand end of the valve chamber 144. At the same time control pressure passage 140 communicates with each of passages 174 and 176 as land 158 seals off the port 166 and land 156 seals off the port at the right-hand end of the valve chamber 144. Passage 140 communicates with passage 176 through an annular groove located at the intersection of passage 176 with the chamber 144.

If the manual valve element 146 is shifted to the D1 position, passages 174 and 176 each are exhausted through the port at the right-hand end of the valve chamber 144. Land 160 seals exhaust port 166. Passages 140 and 138 are brought into communication with passages 170 and 172 and passage 168 is exhausted through the port at the right-hand end of the valve chamber 144.

If the manual valve element 146 is shifted to the manual, low-speed range position L, passage 176 becomes pressurized by reason of the connection between passage 140 and the annular groove at the point of intersection of the passage 176 with the chamber 144. Passage 140 also is brought into communication with passage 172. Passages 170 and 168 both are exhausted through the port at the left-hand end of the valve chamber 144.

If we now assume that the manual valve element 146 is shifted to the D1 position, passage 172 becomes pressurized in the manner previously described. This passage communicates with a 1–2 shift valve chamber 178 for the 1–2 shift valve 180, branch passage 182 being provided for this purpose. Shift valve 180, as seen in FIGURE 2a, includes a multiple land valve spool 184 having spaced valve lands 186, 188, 190, 192, 194, 196 and 198. These lands are slidably situated within internal valve lands formed in the valve chamber 178. Passage 182 communicates with chamber 178 at a location adjacent land 188. Valve land 188 is formed with a slightly larger diameter than valve land 186. Thus when the valve element 184 assumes the position shown in FIGURE 2a, the differential area of lands 186 and 188 is exposed to the pressure in passage 182, thereby tending to maintain valve element 184 in an upright position. It normally is urged into that position by a valve spring 200.

A passage 202 communicates with the valve chamber 178 at a location intermediate valve lands 188 and 190. Exhaust port 204 communicates with the valve chamber 178 when valve element 184 is downshifted. When the valve element 184 is upshifted, passage 202 communicates with passage 182, thereby allowing control pressure distribution to passage 202 and to the apply side of the intermediate servo with which it communicates. The communication between passage 202 and the apply side of the intermediate servo is established in part by a 2–3 backout valve 206 which normally allows free fluid communication between passage 202 and passage 98 during operation in both low and intermediate ratios. Valve element 184 controls also distribution of pressure from passage 176 to passage 208 which extends directly to the feed passage 110 for the low and reverse servo. When the valve element 184 is positioned as shown, communication between passage 176 and passage 208 takes place through the annular opening provided by lands 190 and 192. When the valve element 184 assumes its downward position, however, passage 208 communicates with the exhaust port 204 and land 194 blocks passage 176. Passage 208 communicates also with the lower end of the land 186. Thus when the reverse-and-low servo is applied, the valve element 184 is located in the position shown as the pressure force acting on land 186 supplements the action of spring 200.

If the vehicle is accelerated from a standing start in the low speed ratio with the reaction taken by the overrunning brake 76 and with the reverse and low servo released, passage 208 is exhausted through passage 176, which in turn is exhausted through the manual valve. As the transmission shifts from a low speed ratio to a high speed ratio, the valve element 184 assumes a downward position. At that time a pressure differential acts upon the differential area of lands 186 and 188 due to the existence of pressure in passage 182. It is relieved as the differential area becomes exhausted through passage 208. This produces a snap action in the movement of the valve element 184, and hunting of the valve element is eliminated. This can be described as a hysteresis effect since the valve element 184 will be returned to the low speed ratio position at a speed that is less than the speed at which the upshift from the low speed ratio to the intermediate speed ratio occurred.

The portion of the valve of which lands 196 and 198 form a part is separated from the main part of valve element 184. Passage 168 communicates with a valve chamber 178 at a location adjacent this separation at the land 196.

The diameter of land 198 is greater than the diameter of land 196. This defines a differential area that is in fluid communication with throttle pressure passage 210. This passage receives modulated throttle pressure from a throttle modulator valve 212, which will be described subsequently.

The upper end of land 198 subjected to governor pressure, which is distributed thereto through a governor pressure passage 214. This passage communicates directly with the delivery side of the secondary governor valve 114 so that it is subjected to the pressure signal made available by a secondary governor valve. Passage 172 communicates with the inlet side of the secondary governor valve 114.

Interposed in the passage 214, as seen in FIGURE 2c, is a regulator pressure cutback valve 216, which will be described subsequently.

The 1–2 shift valve moves in a downward direction at a predetermined vehicle speed for any given engine throttle setting. When a shift occurs during normal acceleration from a standing start with the manual valve in the D1 position, the previously exhausted passage 202 becomes pressurized as it communicates with passage 182. An upshift from the intermediate ratio to the high speed ratio during acceleration with the manual valve in the D1 position is controlled by the 2–3 shift valve 218. This valve includes a valve element 220 which is situated slidably within valve chamber 222. Valve element 220 is formed thereon. Valve lands 224, 226 and 228 register with internal valve lands formed in the chamber 222. A valve spring 230 normally urges the valve element 220 in an upward position as viewed in FIGURE 2a.

Passage 170, which is pressurized wherever the manual valve assumes the D1 or D2 position, communicates with the valve chamber 222 at spaced locations through branch passage 232 and 234. Passage 232 communicates with the chamber 222 at a location adjacent land 228. Passage 234 communicates with the chamber 222 at a location adjacent the land 224. A passage 236, which normally is exhausted whenever the manual value is in a forward driving position, communicates with the valve chamber 222 at a location intermediate lands 228 and 226 when the valve element 220 assumes the position shown. It communicates also with the passage 238 through the 2–3 shift valve chamber. Passage 238 in turn communicating directly with passage 240 which communicates with a passage 242; the latter serving as a feed passage for the reverse and direct clutch. Thus, the reverse-and-direct clutch is exhausted when the valve element 220 assumes the position shown at FIGURE 2b and when the manual valve is in the forward drive range position. Passage 170, on the other hand, is blocked when the valve element 220 is in the position shown. It is in fluid communication, however, with passage 238 when it is shifted in a downward direction. At that time passage 234 becomes blocked by land 224.

Land 226 allows communication to take place between passages 234 and 236. It also interrupts communication between passage 236 and 238 as the latter is brought into communication with passage 232.

Land 224 is larger than land 226. Thus when the differential area defined by these lands is in communication with exhausted passage 236, movement of the valve element 220 will occur with a snap action. This introduces hysteresis effect that is similar to the hysteresis effect described with reference to the 1–2 shift valve.

Governor pressure passage 214 distributes governor pressure to the upper end of land 224. The governor pressure force is opposed by the force of spring 230. It is opposed also by the force of the modulated pressure which is distributed to the lower end of land 228 through a passage 241 which communicates with passage 210. This modulated pressure is the output pressure of the throttle modulator valve 212. This valve comprises a single diameter valve element 243 slidably situated within the lower region of the chamber 222.

Spring 230 acts upon the valve element 243. Throttle pressure from throttle booster valve 244, which will be described subsequently, is distributed to the lower end of valve element 243 through a passage 246. Passage 248, which is exhausted whenever the manual valve assumes a position other than the manual low position or the reverse position, communicates with the region of the chamber 222 that is occupied by the spring 230. Thus the valve element 243 is capable of modulating the pressure in passage 246 to produce a modulated output pressure in passage 210 that acts upon the lower end of land 228 of the 2–3 shift valve as well as the differential area of lands 196 and 198 of the 1–2 shift valve assembly.

Passage 248 communicates with a passage 250 through a downshift valve 252. Passage 250 communicates with a passage 254 which in turn communicates with passage 176, the latter being pressurized only during operation in low and reverse.

As the vehicle is accelerated in the intermediate speed ratio, the valve element 220 will move in a downward direction at some particular speed for any given engine throttle setting. At that time passage 232 is brought into communication with passage 238. This causes pressure distribution to the reverse and direct clutch servo. At the same time pressure is distributed to the intermediate servo release chamber through a one-way check valve 256 and through a passage 258 which communicates in turn directly with intermediate servo feed passage 100. Thus the intermediate servo becomes released as the reverse and direct clutch becomes applied.

Passage 240 communicates with the 2–3 backout valve as well as with the reverse and direct clutch servo. The backout valve is directed to throttle pressure through a passage 260. This pressure normally renders inoperative the 2–3 backout valve so that it will not respond to a pressure build-up in passage 240. If a 2–3 shift were to occur with a relaxed throttle, however, passage 260 would be subjected to a reduced throttle pressure. This then would permit restricted communication between passage 240 and passage 98 through the 2–3 backout valve. Direct communication between passages 202 and 98 would be interrupted temporarily. This would cushion the application of the direct drive clutch and effect a synchronous disengagement of the intermediate brake band with respect to the application of the reverse and direct clutch. Passage 254, which is pressurized during operation in low and reverse operation, communicates with the 2–3 backout valve and overrules its function whenever the transmission is conditioned for manual low or reverse operation.

The cutback valve 216, previously mentioned, is in communication with primary throttle valve output pressure passage 260 through a branch passage 262. It communicates also with governor pressure passage 214, as mentioned previously. When the governor pressure is less than a predetermined value, the cutback valve is effective to distribute primary throttle valve output pressure from passage 262 to passage 264 which extends to the main regulator valve. This causes an augmentation in the magnitude of the regulated pressure level maintained by the main regulator valve. When the speed of the vehicle reaches a predetermined value, the distribution of primary throttle pressure from passages 262 to passage 264 is interrupted and the latter is exhausted. This causes a reduction in the magnitude of the regulated pressure level maintained by the main regulator valve. This reduction in the regulated pressure level corresponds to a reduction in the torque transmission requirements through the driveline due in part to the fact that the hydrokinetic torque ratio in the converter is reduced when the vehicle is traveling at speeds greater than the calibrated, predetermined value at which the cutback valve shifts.

The primary throttle valve pressure is produced by a primary throttle valve assembly 266, which includes a multiple land valve spool 268 slidably situated within a valve chamber 270. Valve assembly 266 receives control pressure through passage 118. The output pressure passage 260 for assembly 266, as is explained previously, communicates with line pressure coasting boost valve 272 which distributes the pressure in passage 260 to the main regulator valve, thereby making the main regulator valve responsive to the output pressure of the primary throttle valve assembly. This causes the main regulator valve to regulate at a higher value when the engine manifold pressure is higher than the corresponding value that exists when the engine manifold pressure is low. The line pressure coasting boost valve communicates also with governor pressure passage 214 and with control pressure passage 118, communication with the latter being established by the passage 274. When the vehicle is coasting at a relatively low speed, the main regulator valve operates at a reduced pressure which is sufficient to maintain capacity. If the coasting speed should increase above a predetermined value, however, the increased magnitude of the governor pressure in passage 214 will cause interruption between primary throttle valve pressure passage 260 and passage 276, which extends to the main regulator valve, and at the same time communication between control pressure passage 274 and the passage 276 will be established. This will result in an increased regulated pressure for the main regulator valve thus providing increased coasting torque capacity which is necessary during high speed coasting operation.

The primary throttle valve element 268 registers with internal valve lands formed in the chamber 270. The external valve lands of valve element 268 are identified by reference numerals 278, 280, 282 and 284.

The output pressure passage 260 communicates with the left-hand end of the valve chamber 270 through an internal passage 286 formed in the valve element 268. An exhaust port 288 communicates with the chamber 270 at a location adjacent land 282.

Valve element 268 is adapted to be actuated by a flexible diaphragm assembly 290. This includes a diaphragm housing 292 which cooperates with flexible diaphragm assembly 290 to define a manifold pressure chamber 294. The force acting upon the diaphragm assembly 290 is transmitted to the valve element 268 through a valve rod 296. A compression spring 298 acts upon the diaphragm assembly 290 to urge it normally in a left-hand direction. Chamber 294 is in fluid communication with an engine manifold pressure passage 300, which extends to the engine manifold. A suitable fluid fitting 302 can be provided to establish the necessary connection between passage 300 and the chamber 294.

An increase in the pressure of the manifold for the internal combustion engine will result in an increased output pressure in passage 260. This pressure is distributed through passage 260 to the throttle booster valve 244 which comprises a valve spool 304 having valve lands 306 and 308 of different diameter. Spool 304 is slidably situated in a valve chamber 310. Internal valve lands are formed in the chamber 310, and these cooperate with the differential diameter of lands 306 and 308. Control pressure passage 118 is distributed to the chamber 310 through a passage 312.

Primary throttle valve pressure from passage 260 is distributed to the chamber 310 through a passage 314 and a communicating passage 316. Primary throttle valve pressure is distributed also to the right-hand side of land 308 through a branch passage 318. The force applied to the valve spool 304 by the primary throttle valve pressure in passage 318 is opposed by the force of a valve spring 320. When the throttle pressure is insufficient to overcome the force of spring 320, direct communication is established between passage 316 and a throttle booster valve output pressure passage 322. Thus the pressure that is made available to the lower end of the throttle modulator valve 243 is equal to the output pressure of the primary throttle valve assembly. When the magnitude of the pressure signal developed by the primary throttle valve assembly 266 reaches a value corresponding to an intermediate engine carburetor throttle setting, the spring 320 yields. Thereafter the valve element 304 will modulate the pressure in passage 312 to produce a resultant pressure in passage 322 that is augmented with respect to the magnitude of the pressure in passage 316. In this way the pressure made available to passage 322 can be made partially proportional to engine torque demand as distinguished from engine manifold pressure.

The shift points for the 1–2 shift valve and the 2–3 shift valve then can be tailored to cause shifts at the proper instant. Engine manifold pressure remains relatively unchanged as the engine carburetor throttle setting is changed throughout positions that are close to the maximum opening position. Thus manifold pressure cannot be used as an accurate indicator for establishing a shift point. It can be used, however, to establish a pressure signal that in turn can be used to establish shift points during operation with engine carburetor throttle settings of reduced magnitude.

The downshift valve 252 includes a valve spool 324 having three spaced valve lands 326, 328 and 330. Lands 328 and 330, which are adjacent each other, define a differential area that is in fluid communication with passage 316. Passage 250, which serves as an exhaust passage whenever the manual valve is in any position other than the low position or reverse position, communicates with one end of the valve chamber 332 within which the valve spool 324 is positioned.

Passage 248 communicates, as explained previously, with the valve chamber 332 at a central location. The downshift valve is caused to shift in a right-hand direction whenever the primary throttle valve pressure reaches a maximum value corresponding to a so-called wide-open through-detent position of the engine throttle. At that time passage 316 becomes connected to passage 248 as land 326 blocks passage 250. The pressure in passage 316 at that time is substantially equal to line pressure. This pressure is distributed to each of the shift valves, thereby tending to move them to a downshift position. The force produced by the pressure in passage 248 and in passage 210 is effective to produce a downshift at predetermined vehicle speeds. A downshift from the high speed ratio to the intermediate speed ratio occurs, of course, at a higher limiting speed than the corresponding downshift can be caused to occur from the intermediate speed ratio to the low speed ratio.

Figures 3, 4A, 4B, 5, 6:
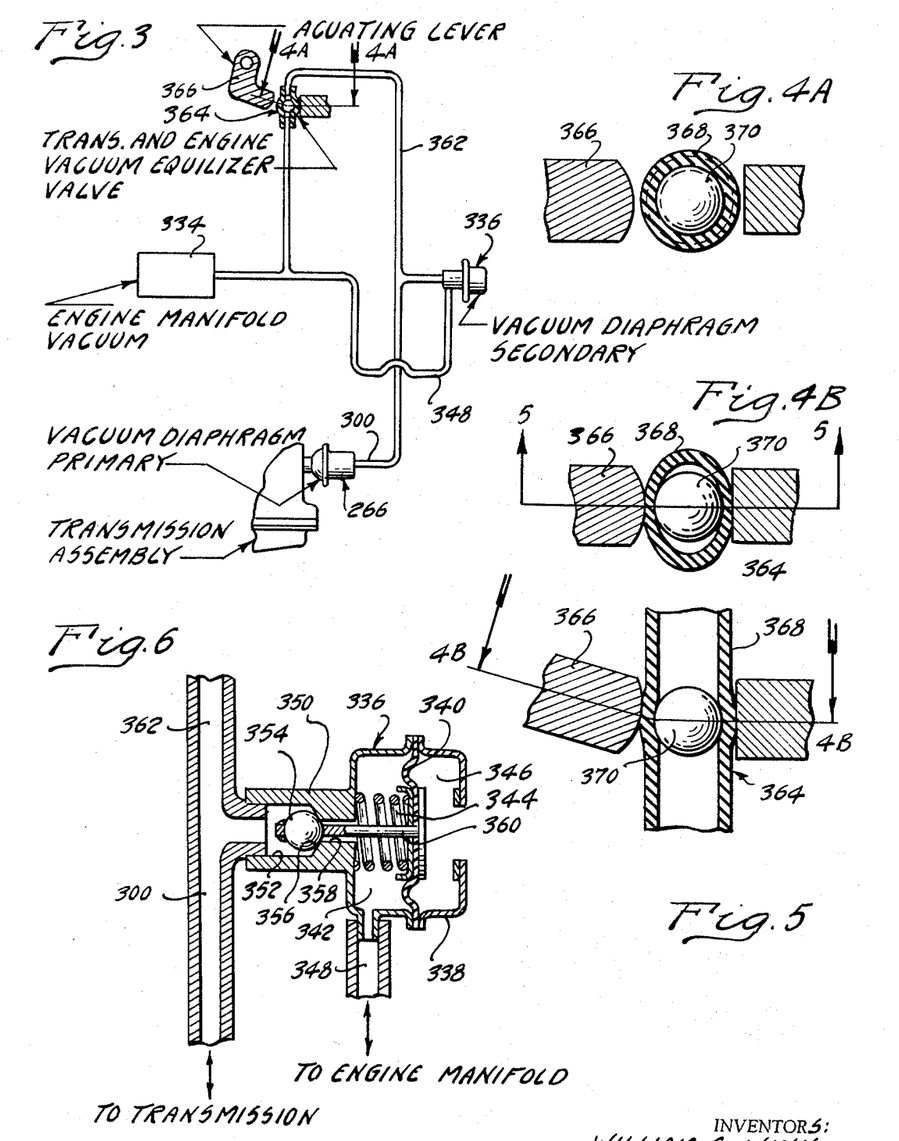

In FIGURE 3 I have illustrated in schematic form a secondary vacuum diaphragm system. The engine, which is identified by reference numeral 334, has an intake manifold connected to the primary vacuum diaphragm assembly 266 through the passage 300. The secondary vacuum diaphragm assembly is identified by reference character 336. The diaphragm assembly 336, as seen in FIGURE 6, includes a housing 338 within which is positioned a flexible diaphragm 340. This diaphragm cooperates with the housing 338 to define a pressure chamber 342. A diaphragm spring 344 is situated between the diaphragm 340 and the housing 338. Atmospheric pressure in chamber 346 of the housing 338 acts upon the other side of the diaphragm 340. Chamber 342 is connected directly to the engine manifold through a passage 348.

The housing 338 has joined thereto a valve body 350 having a valve chamber 352. A ball check valve 354 is located in the valve body 350. It is engageable with a conical valve seat 356. The chamber 352 communicates with the chamber 342 through a passage 358. A valve stem 360 is received through the passage 358 and is capable of transferring to the ball check valve element 354 the valve operating forces developed by the flexible diaphragm 340.

The stem 360 is secured to the ball valve element 354. Thus the ball valve element 354 is urged into sealing engagement with its valve seat 356 by the spring 344.

If the magnitude of the vacuum in the engine manifold is greater than 4 inches of mercury, the valve 354 will be moved off its valve seat 356. This establishes direct communication between the engine manifold and the primary vacuum diaphragm assembly. Thus the throttle valve assembly 266 will produce an output pressure signal that is related in magnitude to engine manifold pressure.

If the vacuum in the engine manifold should decrease to a value less than 4 inches of mercury or less than some other value that may be chosen, the spring 344 will cause the flexible diaphragm to open in a right-hand direction, thereby seating the valve element 354 against the seat 356. This then isolates the primary vacuum diaphragm assembly from the engine manifold. Further changes in manifold pressure, therefore, will result in changes in the output pressure signal in the primary throttle valve assembly 266.

Thus if the vehicle operator should advance the engine carburetor to cause the manifold pressure to increase, the transmission will not be called upon to effect a forced downshift. This is due to the fact that the primary throttle valve assembly becomes isolated from the engine and a residual pressure, which always is greater than a predetermined minimum value, becomes trapped in passage 300.

Parallel with the passage 348 is a secondary passage 362 which connects the passage 300 with the engine manifold. Located in this passage 362 is a transmission and engine vacuum equalizer valve 364. This valve normally interrupts communication between passage 362 and the engine intake manifold. When valve 364 is actuated by lever 366, however, communication is established between passage 300 and the engine intake manifold. The lever 366 in turn is connected mechanically to the engine carburetor throttle which moves to actuate the valve 364 whenever the engine carburetor throttle valve is advanced to a so-called through detent position corresponding to the wide-open throttle setting.

As soon as the valve 364 opens communication between the passage 300 and the engine manifold, the primary throttle valve assembly 266 no longer is isolated from the engine. It therefore is capable of responding to the actual manifold pressure that exists. This pressure, which is usually only slightly less in atmospheric pressure at that time, is sufficient to enable the primary throttle valve assembly to produce a pressure signal that is sufficient to stroke the downshift valve in a right-hand direction. At any throttle pressure signal less than that value that corresponds to the throttle pressure that exists when the actuating lever 366 does not engage the valve 364, the magnitude of the throttle pressure will be insufficient to cause the downshift valve to stroke in a right-hand direction.

It is apparent, therefore, that a forced downshift can occur only when the actuating lever 366 is moved to a through detent position. A forced downshift, which normally would accompany an increase in manifold pressure to a value approaching atmospheric pressure, thus will not occur.

The valve 364 comprises a segment of a flexible tube 368 within which is situated a ball 370. When the actuating lever 366 engages the tube in the region of the ball 370, the tube becomes deformed, thereby establishing communication across the ball by reason of the clearance that is produced. This clearance is indicated best in FIGURE 4b. Thus when the actuating member 366 engages the tube 364, communication is established between the engine manifold and the passage 300. This bypasses the secondary vacuum diaphragm assembly 336. FIGURE 4a shows the valve in the closed position.

When the actuating lever 366 is moved in a clockwise direction, pressure on the tube 368 is relieved and the clearance that exists between the ball 370 and the inner surface of the tube 368 becomes closed. Again a seal is established. Communication thereafter takes place between engine manifold, and the primary vacuum diaphragm assembly 266, and this communication is controlled solely by the secondary vacuum diaphragm assembly 336.

Having thus described a preferred form of our invention, what we claim and desire to secure by use of U.S. Letters Patent is:

1. A control system for an automatic power transmission mechanism having fluid pressure operated servos capable of establishing each of several torque delivery paths between an internal combustion engine and a driven member, said engine having an air-fuel mixture intake manifold, a fluid pressure source, conduit structure connecting said pressure source and said servos, fluid pressure distributor valve means situated in and partly defining said conduit structure for controlling distribution of pressure from said source to each of said servos to effect speed ratio changes, throttle valve means for producing a fluid pressure signal that is proportional in magnitude to engine intake manifold pressure, said throttle valve means being in fluid communication with said distributor valve means whereby the latter is actuated in response to changes in the magnitude of said pressure signal, a manifold pressure passage interconnecting the engine intake manifold and said throttle valve means, a secondary valve means situated in and partly defining said manifold pressure passage including a movable valve element that blocks said manifold pressure passage when it assumes one position and accommodates pressure distribution through said manifold pressure passage when it assumes a second position, and a valve operator means in communication with said engine intake manifold and responsive to changes in the magnitude of the manifold pressure for moving said movable valve element to said second position when the manifold pressure is less than a predetermined value and for effecting movement of said movable valve element to said one position when the manifold pressure is greater than said predetermined value.

2. A control system for an automatic power transmission mechanism having fluid pressure operated servos capable of establishing each of several torque delivery paths, between an internal combustion engine and a driven member, said engine having an air-fuel mixture intake manifold, a fluid pressure source, conduit structure connecting said pressure source and said servos, fluid pressure distributor valve means situated in and partly defining said conduit structure for controlling distribution of pressure from said source to each of said servos to effect speed ratio changes, throttle valve means for producing a fluid pressure signal that is proportional in magnitude to engine intake manifold pressure, said throttle valve means being in fluid communication with said distributor valve means whereby the latter is actuated in response to changes in the magnitude of said pressure signal, a manifold pressure passage interconnecting the engine intake manifold and said throttle valve means, a secondary valve means situated in and partly defining said manifold pressure passage including a movable valve element that blocks said manifold pressure passage when it assumes one position and accommodates pressure distribution through said manifold pressure passage when it assumes a second position, and a valve operator means in communication with said engine intake manifold and responsive to changes in the magnitude of the manifold pressure for moving said movable valve element to said second position when the manifold pressure is less than a predetermined value and for effecting movement of said movable valve element to said one position when the manifold pressure is greater than said predetermined value, a source of a speed signal that is proportional in magnitude to the speed of said driven member, and governor pressure passage means interconnecting said speed signal source with said distributor valve means whereby said speed signal produces a valve actuating force on said distributor valve means that opposes the influence of said throttle valve pressure signal.

3. A control system for an automatic power transmission mechanism having fluid pressure operated servos capable of establishing each of several torque delivery paths between an internal combustion engine and a driven member, said engine having an air-fuel mixture intake manifold, a fluid pressure source, conduit structure connecting said pressure source and said servos, fluid pressure distributor valve means situated in and partly defining said conduit structure for controlling distribution of pressure from said source to each of said servos to effect speed ratio changes, throttle valve means for producing a fluid pressure signal that is proportioned in magnitude to engine intake manifold pressure, said throttle valve means being in fluid communication with said distributor valve means whereby the latter is actuated in response to changes in the magnitude of said pressure signal, a manifold pressure passage interconnecting the engine intake manifold and said throttle valve means, a secondary valve means situated in and partly defining said manifold pressure passage including a movable valve element that blocks said manifold pressure passage when it assumes one position and accommodates pressure distribution through said manifold pressure passage when it assumes a second position, and a valve operator means in communication with said engine intake manifold and responsive to changes in the magnitude of the manifold pressure for moving said movable valve element to said second position when the manifold pressure is less than a predetermined value and for effecting movement of said movable valve element to said one position when the manifold pressure is greater than said predetermined value, a bypass manifold pressure passage arranged in parallel relationship with respect to said secondary valve means, and engine vacuum equalizer valve means for opening and closing said bypass manifold pressure passage for selectively establishing direct communication between said engine manifold and said throttle valve means.

4. A control system for an automatic power transmission mechanism having fluid pressure operated servos capable of establishing each of several torque delivery paths between an internal combustion engine and a driven member, said engine having an air-fuel mixture intake manifold, a fluid pressure source, conduit structure connecting said pressure source and said servos, fluid pressure distributor valve means situated in and partly defining said conduit structure for controlling distribution of pressure from said source to each of said servos to effect speed ratio changes, throttle valve means for producing a fluid pressure signal that is proportional in magnitude to engine intake manifold pressure, said throttle valve means being in fluid communication with said distributor valve means whereby the latter is actuated in response to changes in the magnitude of said pressure signal, a manifold pressure passage interconnecting the engine intake manifold and said throttle valve means, a secondary valve means situated in and partly defining said manifold pressure passage including a movable valve element that blocks said manifold pressure passage when it assumes one position and accommodates pressure distribution through said manifold pressure passage when it assumes a second position, and a valve operator means in communication with said engine intake manifold and responsive to changes in the magnitude of the manifold pressure for moving said movable valve element to said second position when the manifold pressure is less than a predetermined value and for effecting movement of said movable valve element to said one position when the manifold pressure is greater than said predetermined value, a source of a speed signal that is proportional in magnitude to the speed of said driven member, governor pressure passage interconnecting said speed signal source with said distributor valve means whereby said speed signal produces a valve actuating force on said distributor valve means that opposes the influence of said throttle valve pressure signal, a bypass manifold pressure passage arranged in parallel relationship with respect to said secondary valve means, and vacuum equalizer valve means for opening and closing said bypass manifold pressure passage for selectively establishing direct communication between said engine manifold and said throttle valve means.

5. A control system for an automatic power transmission mechanism having fluid pressure operated servos capable of establishing each of several torque delivery paths between an internal combustion engine and a driven member, said engine having an air-fuel mixture intake manifold, a fluid pressure source, conduit structure connecting said pressure source and said servos, fluid pressure distributor valve means situated in and partly defining said conduit structure for controlling distribution of pressure from said source to each of said servos to effect speed ratio changes, throttle valve means for producing a fluid pressure signal that is proportional in magnitude to engine intake manifold pressure, said throttle valve means being in fluid communication with said distributor valve means whereby the latter is actuated in response to changes in the magnitude of said pressure signal, a manifold pressure passage interconnecting the engine intake manifold and said throttle valve means, a secondary valve means situated in and partly defining said manifold pressure passage including a movable valve element that blocks said manifold pressure passage when it assumes one position and accommodates pressure distribution through said manifold pressure passage when it assumes a second position, and a valve operator means in communication with said engine intake manifold and responsive to changes in the magnitude of the manifold pressure for moving said movable valve element to said second position when the manifold pressure is less than a predetermined value and for effecting movement of said movable valve element to said one position when the manifold pressure is greater than said predetermined value, a bypass manifold pressure passage arranged in parallel relationship with respect to said secondary valve means, equalizer valve means for opening and closing said bypass manifold pressure passage for selectively establishing direct communication between said engine manifold and said throttle valve means, said engine including a personally operable carburetor throttle valve in said engine intake manifold, and a personally operable linkage means connected to said engine throttle for actuating said equalizer valve to an open position when said carburetor throttle valve assumes an advanced open position.

6. A control system for an automatic power transmission mechanism having fluid pressure operated servos capable of establishing each of several torque delivery paths between an internal combustion engine and a driven member, said engine having an air-fuel mixture intake manifold, a fluid pressure source, conduit structure connecting said pressure source and said servos, fluid pressure distributor valve means situated in and partly defining said conduit structure for controlling distribution of pressure from said source to each of said servos to effect speed ratio changes, throttle valve means for producing a fluid pressure signal that is proportional in magnitude to engine intake manifold pressure, said throttle valve means being in fluid communication with said distributor valve means whereby the latter is actuated in response to changes in the magnitude of said pressure signal, a manifold pressure passage interconnecting the engine intake manifold and said throttle valve means, a secondary valve means situated in and partly defining said manifold pressure passage including a movable valve element that blocks said manifold pressure passage when it assumes one position and accommodates pressure distribution through said manifold pressure passage when it assumes a second position, and a valve operator means in communication with said engine intake manifold and responsive to changes in the magnitude of the manifold pressure for moving said movable valve element to said second position when the manifold pressure is less than a predetermined value and for effecting movement of said movable valve element to said one position when the manifold pressure is greater than said predetermined value, a source of a speed signal that is proportional in magnitude to the speed of said driven member, governor pressure passage means interconnecting said speed signal source with said distributor valve means whereby said speed signal produces a valve actuating force on said distributor valve means that opposes the influence of said throttle valve pressure signal, a bypass manifold pressure passage arranged in parallel relationship with respect to said secondary valve means, equalizer valve means for opening and closing said bypass manifold pressure passage for selectively establishing direct communication between said engine manifold and said throttle valve means, said engine including a personally operable carburetor throttle valve in said engine intake manifold, a personally operable linkage means connected to said engine throttle for actuating said equalizer valve to an open position when said carburetor throttle valve assumes an advanced open position.

7. The combination as set forth in claim 1 wherein the actuating force of said secondary valve means comprises a flexible diaphragm and a housing supporting said diaphragm, said housing and said diaphragm defining a pressure chamber, a connection between said flexible diaphragm and said movable valve element, and spring means located in said chamber for normally urging said valve element to said one position, the pressure differential across said diaphragm being effective to overcome the force of said spring means when the manifold pressure is less than a predetermined value.

8. The combination as set forth in claim 2 wherein the actuating force of said secondary valve means comprises a flexible diaphragm and a housing supporting said diaphragm, said housing and said diaphragm defining a pressure chamber, a connection between said flexible diaphragm and said movable valve element, and spring means located in said chamber for normally urging said valve element to said one position, the pressure differential across said diaphragm being effective to overcome the force of said spring means when the manifold pressure is less than a predetermined value.

9. The combination as set forth in claim 3 wherein the actuating force of said secondary valve means comprises a flexible diaphragm and a housing supporting said diaphragm, said housing and said diaphragm defining a pressure chamber, a connection between said flexible diaphragm and said movable valve element, and spring means located in said chamber for normally urging said valve element to said one position, the pressure differential across said diaphragm being effective to overcome the force of said spring means when the manifold pressure is less than a predetermined value.

10. The combination as set forth in claim 4 wherein the actuating force of said secondary valve means comprises a flexible diaphragm and a housing supporting said diaphragm, said housing and said diaphragm defining a pressure chamber, a connection between said flexible diaphragm and said movable valve element, and spring means located in said chamber for normally urging said valve element to said one position, the pressure differential across said diaphragm being effective to overcome the force of said spring means when the manifold pressure is less than a predetermined value.

11. The combination as set forth in claim 5 wherein the actuating force of said secondary valve means comprises a flexible diaphragm and a housing supporting said diaphragm, said housing and said diaphragm defining a pressure chamber, a connection between said flexible diaphragm and said movable valve element, and spring means located in said chamber for normally urging said valve element to said one position, the pressure differential across said diaphragm being effective to overcome the force of said spring means when the manifold pressure is less than a predetermined value.

12. The combination as set forth in claim 6 wherein the actuating force of said secondary valve means comprises a flexible diaphragm and a housing supporting said diaphragm, said housing and said diaphragm defining a pressure chamber, a connection between said flexible diaphragm and said movable valve element, and spring means located in said chamber for normally urging said valve element to said one position, the pressure differential across said diaphragm being effective to overcome the force of said spring means when the manifold pressure is less than a predetermined value.

References Cited
UNITED STATES PATENTS

| | | | |
|---|---|---|---|
| 2,756,616 | 7/1956 | Forster | 74—732 |
| 3,095,755 | 7/1963 | Duffy | 74—864 |
| 3,142,999 | 8/1964 | Searles et al. | 74—868 |
| 3,258,984 | 7/1966 | Searles | 74—864 |
| 3,308,676 | 3/1967 | Zundel et al. | 74—864 |

DONLEY J. STOCKING, *Primary Examiner.*

ARTHUR T. McKEON, *Examiner.*